United States Patent [19]

Ferris et al.

[11] 4,373,862
[45] Feb. 15, 1983

[54] ROTOR BLADE SHAFT INTEGRITY MONITORING SYSTEM

[75] Inventors: Donald L. Ferris, Newtown; Peter C. Ogle, Woodbridge, both of Conn.

[73] Assignee: United Technologies Corporation, Hartford, Conn.

[21] Appl. No.: 315,125

[22] Filed: Oct. 26, 1981

[51] Int. Cl.$^3$ .................... B64C 11/16; B64C 27/48
[52] U.S. Cl. .................... 416/61; 416/134 A; 416/226; 73/40.7; 116/264
[58] Field of Search .................... 416/61, 134 R, 134 A, 416/226, 138 A; 73/40.7; 116/264

[56] References Cited

U.S. PATENT DOCUMENTS

| | | | |
|---|---|---|---|
| 1,778,648 | 10/1930 | Van Dyken | 416/61 UX |
| 3,734,642 | 5/1973 | Dixon | 416/61 |
| 4,264,277 | 4/1981 | McCafferty | 416/134 A |

FOREIGN PATENT DOCUMENTS

| | | | |
|---|---|---|---|
| 1568455 | 5/1980 | United Kingdom | 416/61 |
| 382548 | 10/1974 | U.S.S.R. | 416/61 |

Primary Examiner—Philip R. Coe
Assistant Examiner—Joseph M. Pitko
Attorney, Agent, or Firm—Vernon F. Hauschild

[57] ABSTRACT

A helicopter rotor blade to hub arm attachment configured to react centrifugal loads from the blade through a blade cuff, spindle, and elastomeric bearings utilizes a pre-loaded bolt through the spindle for load sharing therewith and a spindle integrity monitoring indicator to provide a visual showing of a deviation from the normal load sharing proportion.

7 Claims, 5 Drawing Figures

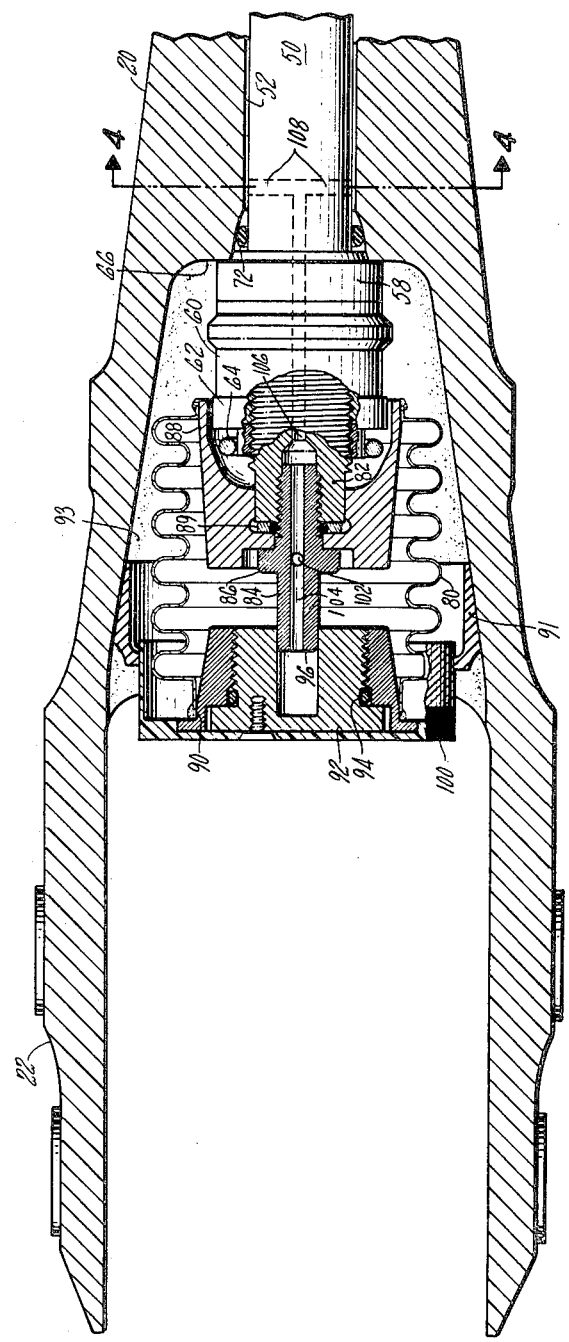

ROTOR BLADE SHAFT INTEGRITY MONITORING SYSTEM

TECHNICAL FIELD

This invention relates to helicopter rotors and more particularly to an improved blade retention apparatus including a redundant tension member and an indicator system to monitor the reliability of the primary member.

BACKGROUND ART

Several current production model helicopters use elastomeric bearings to support rotor blades from the rotor hub. Such bearings comprise stacks of alternating rubber and metal laminates in various geometric shapes, and relative motion between the blade and the hub is accommodated by incremental shear of each rubber laminate. One configuration for such a rotor is shown in U.S. Pat. No. 4,203,708 to Rybicki and is used on the Sikorsky S-76 model helicopter. An array of two elastomeric bearings is used in that configuration. Each blade is attached to its associated rotor hub arm by a root end blade shank portion called a spindle that extends through the center of both bearings and at its innermost end is attached to the inner race of the inboard bearing. A large nut threaded to the end of the spindle acts as a shoulder against the bearing race and carries the load from the spindle to the bearing array. Operational experience has shown that the dynamic components of the helicopter—most notably the rotor blades, rotor hub, and control linkages—are critical elements to the reliability of the aircraft. Engineering design efforts are continuously being expended to refine and improve these components to increase their strength, service life and reliability, and to decrease their weight, cost, drag, and maintenance requirements. These efforts include ideas and configurations directed towards redundancy, integrity monitoring, and adoption of fail-safe concepts. One example of a redundancy concept applied to a rotor head is illustrated by U.S. Pat. No. 3,761,199 to Ferris and Zincone. The patent covers a rotor hub having a central bore connected to the drive shaft and a series of radially extending spokes carrying a truss-shaped outer blade support. The truss design allows centrifugal, torsional, and thrust loads to be carried by the spoke members in the event of failure of the outer support.

An example of the integrity monitoring concept in this field is illustrated by U.S. Pat. No. 3,134,445 to Hotchkiss. The patent relates to the concept of applying a small amount of gas pressure to the hollow, sealed structural spar of the blade such that gas leakage due to a crack in the spar wall will be sensed and indication visibly displayed by a diaphragm as a warning to the operator of impending failure due to fracture of the spar. Several forms of this concept, including both ground and in-flight detectable systems, have been used to monitor the integrity of blade spars. These systems and related hardware are associated with the trademark BIM. One of the challenges to the helicopter dynamics designer in realizing the benefits of each of these systems is to design a component to incorporate both features. This involves the provision of redundancy such that a secondary system will take over full function upon failure of the primary system, together with an indication system that will provide the knowledge to the operator that the redundant or backup system has come into effect. For example, it is important to airplane flight safety that a second or backup wing beam take over structural support upon the failure of a primary beam, but it is just as important to alert the pilot that damage has occurred and should be corrected. Fail-safe systems are only the first steps in design and must be followed by a damage detection system.

DISCLOSURE OF INVENTION

This invention is considered a product improvement of the rotor blade attachment component depicted in the aforementioned U.S. Pat. No. 4,203,708, which configuration does not include a fail-safe redundancy feature. Our invention provides a redundancy means to that component—namely, the blade spindle—and also provides an inspection system to monitor its integrity as a primary load-carrying component. Further, the inspection system provides for dual indication when activated. The inventive element is the integration or merging of the redundancy and inspection features without compromise to either feature and without adding to parasite drag or excessively increasing weight. Further, the configuration devised not only accommodates the presence of centrifugal force but uses it to advantage. Still further, the configuration operates without a connection to a power source such as electrical, hydraulic, or pneumatic.

With reference to U.S. Pat. No. 4,203,708, it will be understood that the blade spindle is a sophisticated hollow and generally tubular shaft member that terminates at its outboard end in a bifurcated cuff to which the rotor blade is bolted. The inner portion passes through the centers of both a spherical and a flat disc type elastomeric bearing and connects to the face of the inner bearing by means of a large jam nut, several smaller bolts, and a spline. At intermediate points along its length the spindle carries a flapping restrainer, a droop stop ring, a pitch control horn, and a shear bearing. Inasmuch as one half of the spindle, including its attachment to the inner bearing, is internal to the propeller type hub arm of the rotor, and therefore hidden from sight, visual inspection of the entire spindle cannot be performed. Disassembly is required to examine its cross section at the spline and threaded area.

The redundancy feature provided is the use of a coaxial, high-strength bolt internal to the spindle and extending at both ends. Pre-loading the bolt allows load sharing between the bolt and the spindle as blade-generated centrifugal force relieves the pre-load. Varying the amount of pre-load allows for adjustment of the degree of load sharing. Inspection monitoring of this critical spindle shaft is provided by use of a fluorescent or colored dye normally contained under pressure in the sealed bore of the spindle. Stress-induced cracks that might occur in the critical inner end of the spindle allow penetration of the dye to the external surface of the spindle. The pressurization provides assurance that a sufficient amount of dye will escape for detection during flight of the aircraft. Blade centrifugal force assists the external spread of the dye outboard along the spindle outer surface past the hub arm opening where the presence of the bright colored dye against the spindle's metallic background will be quite evident to ground support personnel after flight. Pressurization is provided by mechanical bias means such as a metal or elastomer spring container acting in tension and tending to decrease the volume of the cavity in which the dye is stored. The spring means is purposely located in an open and visible but protected area of the spindle; in this case, confined in the cuff attachment portion just inboard of the blade connection. Further protection is provided to the spring container by a moulded lip seal bonded within the spindle cavity and sealing against a shield mounted to the outboard end of the spring container assembly. This prevents ice and dirt from building up on the convolutes of the spring container which might inhibit compression or actuation of the indicating system. The shield outer diameter is adapted to translate alongside the lip seal and provides a bright colored indication area which is exposed only when the spring container is extended and in a pressurized condition.

BRIEF DESCRIPTION OF THE DRAWINGS

FIG. 3 is a still larger showing of the outboard end of the spindle to illustrate the bellows.

BEST MODE FOR CARRYING OUT THE INVENTION

Figures 1, 1A:
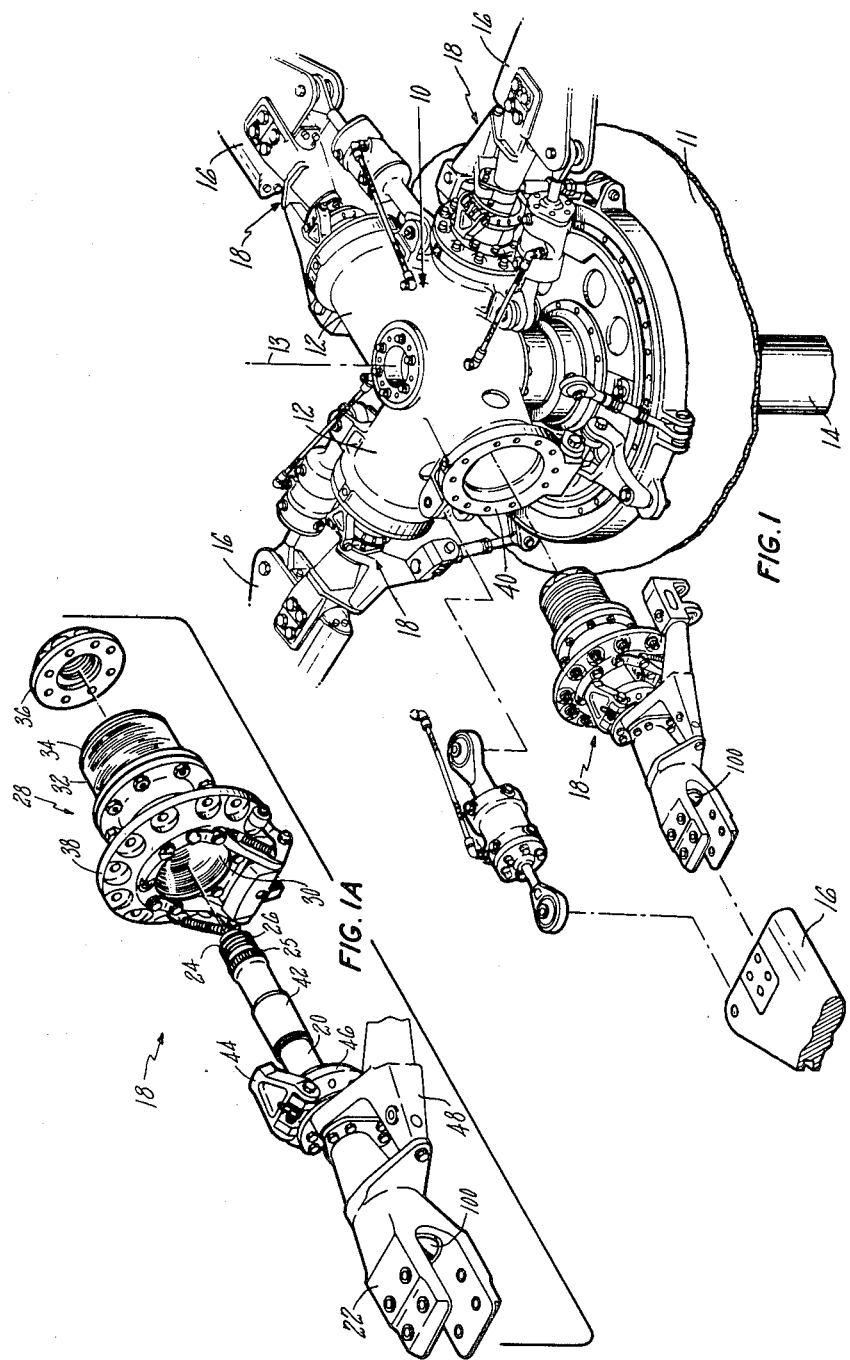
FIG. 1 is an isometric view of the S-76 helicopter rotor head wherein one of the four spindle assemblies is shown as a module detached from the hub arm and control linkage.
FIG. 1a is an exploded isometric view of a spindle assembly of FIG. 1.

The typical Sikorsky-type elastomeric bearing helicopter rotor head is depicted in FIG. 1 wherein hub 10 includes four hub arms 12 and which hub 10 is bolted to the drive shaft 14. A rotor blade 16 is mounted to each hub arm 12 by a spindle assembly 18 to provide full articulated blade motion in pitch, droop, flap, lead, and lag. The main component of the spindle assembly 18 is the spindle 20, a generally cylindrical member including a bifurcated cuff 22 at its outer end for bolted attachment to the root end of blade 16. The inner end 24 of the spindle 20 is rigidly attached by spline 25 and thread 26 to bearing array 28, which in turn is supported from hub arm 12. Bearing array 28 comprises spherical bearing 30 and thrust bearing 32 and is more specifically described with reference to U.S. Pat. No. 3,782,854. Spline 25 of spindle 20 engages a mating spline (not shown) of the inner face 34 of thrust bearing 32 to prevent relative rotation. Axial motion is prevented by engagement of nut 36 with the thread 26 of spindle 20. Installation of the spindle assembly 18 into hub arm 12 is accomplished by bolting outer face 38 to the outer flange 40 of hub arm 12. The further complexity and importance of the spindle assembly 18 is realized by noting that its components also include shear bearing 42, flap restrainer 44, droop stop ring 46, and the pitch control horn 48. Aforementioned U.S. Pat. No. 4,203,708 describes some of the functions of these components in greater detail.

Figures 2, 4:
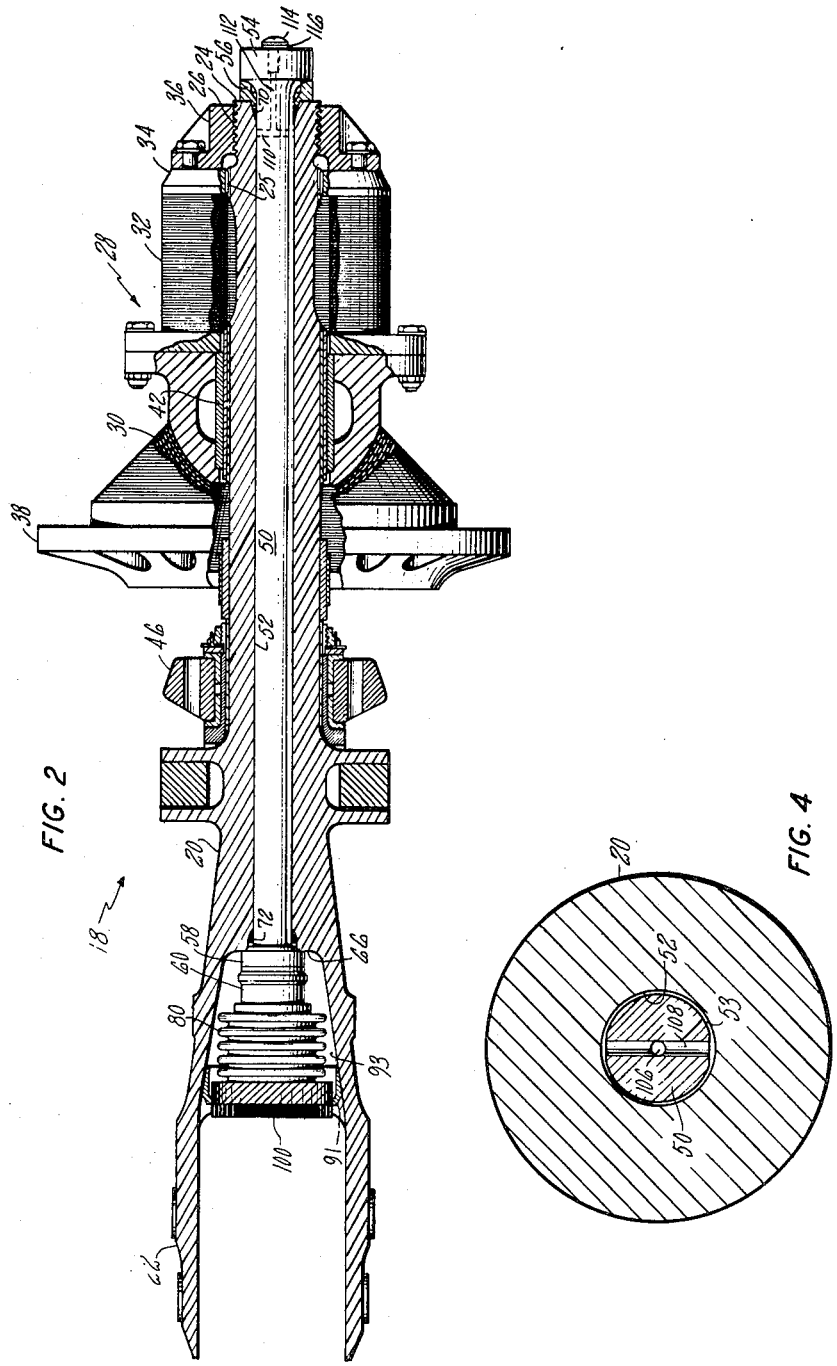
FIG. 2 is a larger scale cross-sectional showing of a typical spindle assembly installed in a rotor hub arm and depicting the preferred embodiment of this invention.
FIG. 4 is a cross-sectional view taken along line 4—4 of FIG. 3.

FIG. 2 illustrates both the redundant means added to the spindle assembly as an improvement to the configuration illustrated in the '708 patent together with the integrity monitoring means associated therewith that provides knowledge to the operator or service personnel that damage has occurred to the spindle assembly, and the normal load path has been diverted to a backup path. Spindle replacement can then be scheduled. Still referring to FIG. 2, we can realize that the primary load path of the reaction to blade centrifugal force travels inboard the length of spindle 20 to its innermost end 24 at thread 26. Tension loading in spindle 20 translates to compression loading in the bearing array 28 as the load reverses through jam nut 36. Such was the sole load path until the addition herewith of bolt 50, located in the bore 52 of spindle 20, with generous clearance between bolt and bore providing an annulus 53 of several thousandths of an inch that is illustrated in FIG. 4. Bolt head 54 and spherical washer 56 are provided at the inner end 24 of spindle 20, while spacer 58, nut 60, nut lock 62, and nut lock ring 64 are provided at the opposite end. A pre-load may be provided to bolt 50 prior to installation of the spindle assembly into the hub arm 12. Under centrifugal operating loads imposed on the spindle 20, shoulder 66 will bear against spacer 58 and impose a tension load into bolt 50. This tension load will be reversed at the bolt head 54 so as to create a compression load path through bushing 56, spindle end 24, and nut 36 into the bearing array 28. The spherical shape of the washer 56 aids in centering the bolt 50 so as to provide tensile loading only across its cross section. Thus, the bolt 50 creates a secondary load path that may either share the total load or be held in reserve until failure of a member in the primary load path. When a pre-load is applied to the bolt, the degree of load sharing between the two load paths will be a function of the amount of pre-load. A failure of the spindle in its cross section, such as a crack which would open to an enlarged condition under centrifugal force, would render the spindle incapable of continued tensile loading. Upon such failure, the bolt 50 will become the primary load path. The spindle will be relieved of loading for its length inboard of the shoulder 66.

The difficulty of periodically inspecting the entire length of the spindle 20 to learn of its possible failed condition is tedious because over half of the spindle is hidden from external view by the bearing array 28 and hub arm 12. Thus, we have devised a dual spindle inspection system to monitor the integrity of the component and provide a readily detectable and visual indication of either partial or full spindle malfunction. The bore 52 of the spindle 20 is sealed to form a closed vessel by means of stationary O-ring type seals 70 and 72 at its opposite ends acting in conjunction with the outer diameter of the bolt 50. A suitable low viscosity dye is introduced into the annular space 53 defined by the internal bore 52 of the spindle 20, bolt 50, and seals 70 and 72. The dye will flow through any small crack of the spindle to the outer surface and when colored or fluorescent will appear as a prominent stain on the external surface. The use of dye for detection of cracks and potential failure in components is known, and one reference to aircraft usage is the development of the "bleeding bolt" at British Aerospace Dynamics for structural applications.

To provide positive assurance that the dye or penetrant fluid used will flow through any crack in the spindle 20 and to further provide a second means for indication redundancy, the chamber containing the dye is pressurized. Pressurization will preempt the need for temperature compensation and allow system reliability while using a small amount of dye or small chamber for dye storage. A mechanical spring container in the form of a bellows 80 acts in conjunction with the spindle bore 52 to both contain dye and to provide pressurization to urge the dye through any small crack extending through the wall of the spindle 20. Since the bolt 50 occupies a large proportion of the volume of the spindle bore 52, the total amount of dye present in the bore and bellows is limited to a few ounces. Flats may be machined on the outer diameter of the bolt 50 to further increase the space between bolt 50 and bore 52 as shown in FIG. 4. To compensate for the small amount of fluid available to extend over the long spindle bore, it is desirable that the pressure imposed by the expanded bellows 80 be great enough to compensate for small changes in volume due to temperature variations and also to pump dye against centrifugal force from the bellows 80 to the inboard end of the spindle bore. Centrifugal force can then carry the escaped dye externally back from the crack in spindle wall 20 past spline 25, mating surfaces of spindle 20 and shear bearing 42, to droop stop ring 46, past the opening of hub arm 12 so as to be visible by ground support personnel after aircraft flight. We recognize that a crack in the spindle 20 will be open to the fullest for passage of dye when the spindle is under centrifugal force and may close when the blade is stationary. Therefore, it is important that the bellows be adequately pressurized to drive the dye through the crack while overcoming centrifugal force. The bellows 80 is attached as follows to the outboard end 82 of the bolt 50 and is shown in FIG. 2 in its collapsed or negligible pressure condition. Stud 84 is threadably attached to the end 82 of bolt 50 by rotating nut portion 86 and stud 84 supports a first bellows flange 88 to which the inner end of bellows 80 is attached. A sealing washer 89 prevents leakage between bellows flange 88 and end 82 of bolt 50. The outer end of bellows 80 is attached to a second bellows flange 90 which threadably engages filler plug 92. An O-ring 94 seals this threaded connection. To allow axial freedom for the bellows 80 to expand and contract, the plug 92 is piloted loosely on a cylindrical extension 96 of stud 84 but of sufficient closeness as to support outer flange 90 against any out-of-plane motions of spindle 20 and bellows 80. Indicator shield 100 is attached to filler plug 92. The shield 100 is preferably of molded plastic in a brigh fluorescent green color. Molded lip seal 91 is bonded within spindle cavity 93 and protects bellows 80 from environmental or other damage. When the bellows 80 is at its minimum pressure condition with a large portion of the shield 100 hidden from sight behind seal 91, the exposed shield portion will be painted a dull color, such as black. Thus, whenever the bellows 80 is extended, as in its normal condition and as shown in FIG. 3, the bright green portion will be visible outboard of the lip seal 91. This appearance of the green portion of shield 100 will indicate a fully pressurized system and comprises the second visual indication of a fully capable spindle to ground support personnel. The axial location of the black paint on the outer portion of the shield 100 must be carefully coordinated with the pressure drop expected due to a leak while under the opposing influence of centrifugal force. This takes into account the possibility that when the helicopter lands, the spindle crack may close before the bellows fully loses pressure. Since it has been determined that the bellows requires a minimum of 20 psi to overcome centrifugal force, there should be no green portion of shield 100 showing when the bellows 80 pressure is below 20 psi.

Dye located internal to the bellows 80 is supplied to the annular chamber 53 through a lateral hole 102 in stud 84 and into axial hole 104 in stud 84 where it enters axial hole 106 in the end of bolt 50 and exits through cross ports 108 in bolt 50. Similar cross ports 110 and axial hole 112 are machined in the inboard end of bolt 50. The axial hole 112 is sealed by plug 114 and O-ring 116. The purpose of these holes and this plug is for bleeding air from the internal dye chamber at initial filling and pressurizing.

OPERATION

As mentioned above, the spindle assembly 18 is a highly critical portion of the helicopter rotor head in that it provides the sole connection between a main rotor blade and the rotor head. It is desirable for a backup or redundant structure to be available to take over the loading normally carried by the spindle in the event of a spindle failure. This function is provided herewith by the pre-load bolt 50. When the spindle 20 is combined with its associated components to form the spindle assembly, the bolt 50 is inserted and torqued to a predetermined load, since it is desired that the bolt not only serve as a redundant member to carry the full load upon spindle failure but should share the load under normal circumstances. This lowering of the load carried by the spindle also acts to decrease its failure likelihood and extends its service life.

With the spindle assembly placed in a vertical position resting on the bolt head 54, dye is inserted into the bellows 80 with plug 92, seal 94, and shield 100 removed. The bellows 80 is extended to its maximum expanded position and filled with dye to its fullest capacity. Then the seal 94 and plug 92 are installed. The spindle assembly may then be turned upside down and plug 114 and seal 116 removed to bleed any air entrapped in the enclosure. If a large amount of air has been trapped, it may be necessary to repeat the fill procedure. The shield 100 is then attached to plug 92 with verification made that a green portion of its surface is visible.

With the bellows 80 filled, as shown in FIG. 3, and the bolt 50 pre-loaded, the bearing array 28 is slid into place co-axial to the spindle 20, and the spindle spline 25 is engaged with a mating spline of the race 34 of the thrust bearing 32. End nut 36 is installed on the thread 26 of spindle 20, and the nut and face 34 are connected by suitable bolts or pins locking the nut. Flange 38 of the outer bearing 30 is then bolted to hub arm 12.

Should a crack appear in the wall of spindle 20, as, for example, in the area of spline 25 or thread 26, propagation could occur as a result of the high loads carried by the spindle until a cross-sectional failure occurred in the spindle wall. With the threaded connection 26 no longer able to carry the tension load of the spindle 20, unloading and spindle separation will occur. At this point in time the full tension loading carried by the spindle 20 will be transferred to a compression loading of the spindle 20 and tension load in the bolt 50. The bolt geometry, material, hardness, etc., must be designed to sustain this full tension load.

The propagation of any crack through the wall of the spindle 20 will create an opening for escape of the dye present under pressure in the spindle bore 52 and in the body of the bellows 80. The spring bias of the bellows 80 will drive the dye through the opening against centrifugal force. Once the dye has escaped to the outer surface of the spindle 20, as, for example, in the area of the nut 36, the same centrifugal force will urge the dye in an outboard direction along the outer diameter of the spindle 20. When the dye reaches the opening of the hub arm 12, it will not be hidden from sight, and its stain on the spindle external surface will be visible to ground crews inspecting the components prior to the next helicopter flight. An indication of dye on the spindle exterior serves as a notice to the ground crew that the preload bolt 50 has become the primary load carrying member, and the spindle 20 should be replaced.

Beyond the indication of failure presented by the dye stain, there is a second visible warning associated with this configuration provided to the ground crew that relates to the collapse of the bellows 80 as its spring bias drives the liquid dye through the spindle wall crack to its outer surface. As mentioned above, the sleeve 100 attached to the free end flange 90 of the bellows 80 is bright green colored on its inboard end that is adjusted to be visible when the bellows 80 is pressurized to and beyond a minimum. Upon collapse of the bellows 80, however, due to escape of dye, the sleeve 100 will move inwardly and its green surface will become hidden under lip seal 91 of the spindle 20, inboard of its bifurcated arms 22. As part of a pre-flight check list, it is routine for the pilot or ground crew to make a visual inspection of the aircraft, and the rotor head dynamic components are among the items usually inspected. Thus, either the presence of a dye stain on the spindle 20 or its associated and connected parts or the lack of showing of the green color of the shield 100 mounted to bellows 80 will give adequate reason to suspect a spindle failure. Since this indication signals that the redundant bolt 50 has taken over full blade load carrying function, immediate spindle replacement may not be necessary but desirable and can be scheduled.

Numerous variations may be chosen in regard to this combination redundancy/indication system. One of these is the device or apparatus used to bias or pressurize the dye. While a metal bellows 80 is preferred, other means are acceptable, such as a single piston/cylinder having a coil spring to provide bias to drive the sleeve 100 or an elastomeric member which functions as both a seal and spring while supporting the shield 100. The amount of pressure and range of pressure necessary to assure dye flow inwardly while overcoming the effects of centrifugal force is a major consideration. In some applications, the effects of flight produced centrifugal force may be ignored depending on the length of time that the helicopter is parked, allowing the dye to seep through any spindle crack. One disadvantage of such procedure is the loss of the beneficial aspect of the centrifugal force in spreading the dye outboard as soon as it has penetrated through a crack in the inboard end of the spindle 20. Since that portion of the spindle is hidden from sight by the hub arm 12, a ground inspection might not reveal the presence of dye until a subsequent post-flight inspection.

The choice of dye is also a variable, but generally it should be of a contrasting color relative to the titanium or steel spindle. Its viscosity should allow fast penetration through small cracks or crevices and flow along smooth surfaces but should have the capacity to leave a stain on the parent metal that will not wash off by rainfall or dissolve by contact with hydraulic fluids. It should be minimally effected by temperature changes and able to flow in freezing weather. The dye currently used in connection with the invention is known as "Isopar M" with red dye added and may be procured from Exxon Corporation.

In our preferred embodiment, the bolt 50 is preloaded to share operational loads, and such preloading is performed prior to installation of the bearing array 28 and nut 36 onto the spindle 20. Since the bolt head 54 is smaller than the spindle thread 26, the bearing array 28 may be replaced without disturbing the bolt and its pre load. If it is found desirable to provide redundancy for the spindle thread 26, the bolt head can be enlarged to overlap the nut 36.

We claim:

1. A helicopter rotor including a hub member mounted for rotation about an axis of rotation and having at least one hub arm and related helicopter blade projecting substantially radially therefrom for rotation therewith and an improved spindle assembly comprising:
   a hollow spindle shaft extending radially from within the hub arm and outwardly therebeyond and having a radial inner end, a radial outer end and a central bore extending the full length of said shaft, said radial outer end shaped to define an enlarged chamber contiguous with the spindle bore and being adapted to be operatively connected to a helicopter blade,
   bearing means operatively connecting the spindle shaft inner end to the hub arm and operative so as to support said spindle shaft and hence the blade from the hub so that blade centrifugal loading during rotor operation will be passed through said spindle shaft and said bearing means to said hub,
   a thru-bolt extending through the spindle shaft bore for the full length thereof and having an inner end comprising a bolt head abutting said spindle inner end and having an outer end extending beyond the radially outer end of the shaft bore and into said spindle outer end enlarged chamber, said thru-bolt having an outer diameter selectively smaller than the spindle shaft bore so as to define a substantially annular chamber therebetween extending for substantially the full radial dimension of said bore,
   means to operatively connect the thru-bolt outer end to the spindle shaft outer end to serve as a redundant centrifugal load path in the event of spindle shaft failure,
   means to seal opposite ends of said annular chamber adjacent the radial inner and outer ends of the spindle bore, and
   means to provide fluid dye under pressure into said sealed annular chamber so as to escape through any crack which might develop in the spindle shaft wall and then be aided by centrifugal force to flow along the outer surface of the spindle shaft to an area external of the hub arm for visual detection.

2. A helicopter rotor according to claim 1 wherein said improved spindle assembly includes means to preload said thru-bolt so as to bear against the spindle shaft at the radial inner and outer ends thereof to thereby selectively share centrifugal blade loading with the spindle shaft.

3. A helicopter rotor according to claim 1 wherein said pressurized dye providing means comprises a mechanical spring container adapted to contain the dye in communication with the annular chamber and to pressurize the dye within the annular chamber.

4. A helicopter rotor according to claim 3 and including a spherical washer connecting the thru-bolt head to the spindle shaft inner end so as to center the thru-bolt within the shaft and thereby prevent eccentric loading of the thru bolt.

5. A helicopter rotor according to claim 3 wherein the mechanical spring container comprises a metal bellows assembly.

6. A helicopter rotor according to claim 5 wherein the inner end of the metal bellows assembly is attached to the outer end of the thru-bolt and is located in the enlarged chamber at the outer end of the spindle shaft.

7. A helicopter rotor according to claim 6 wherein the metal bellows assembly further includes a cylindrical indicator shield attached to its outer end and also wherein the outer end of the spindle is shaped to expose the indicator shield whereby displacement of the shield may be visually detected.

* * * * *

UNITED STATES PATENT AND TRADEMARK OFFICE
CERTIFICATE OF CORRECTION

PATENT NO. : 4,373,862

DATED : February 15, 1983

INVENTOR(S) : Donald L. Ferris; Peter C. Ogle

It is certified that error appears in the above-identified patent and that said Letters Patent is hereby corrected as shown below:

Col. 2, Line 35    "face" should read --race--

Col. 3, Line 49    "face" should read --race--

Line 53    "face" should read --race--

Col. 6, Line 3    "of" should read --for--

Line 42    "face" should read --race--

Signed and Sealed this

Twentieth Day of September 1983

[SEAL]

Attest:

GERALD J. MOSSINGHOFF

Attesting Officer    Commissioner of Patents and Trademarks